United States Patent

Crast, Jr.

[15] 3,687,948
[45] Aug. 29, 1972

[54] 7-[D-(A-AMINO-A-PHENYLACETAMIDO)]-3-(4-METHYL-1,3-OXAZOL-2-YLTHIOMETHYL-3-CEPHEM-4-CARBOXYLIC ACID AND SALTS THEREOF

[72] Inventor: Leonard Bruce Crast, Jr., Clay, N.Y.

[73] Assignee: Bristol-Myers Company, New York, N.Y.

[22] Filed: Nov. 23, 1970

[21] Appl. No.: 92,188

[52] U.S. Cl. ..............................260/243 C, 424/246
[51] Int. Cl. ..............................................C07d 99/24
[58] Field of Search ..................................260/243 C

[56] References Cited

UNITED STATES PATENTS

| | | |
|---|---|---|
| 3,516,997 | 6/1970 | Takano et al. ..........260/243 C |
| 3,243,435 | 3/1966 | Cowley et al. ..........260/243 C |
| 3,365,449 | 1/1968 | Takano et al. ..........260/243 C |
| 3,530,123 | 9/1970 | Takano et al. ..........260/243 C |
| 3,531,481 | 9/1970 | Pfeiffer ..................260/243 C |

*Primary Examiner*—Nicholas S. Rizzo
*Attorney*—Herbert W. Taylor, Jr., Robert E. Havranek, Richard H. Brink and James Magee, Jr.

[57] ABSTRACT

7-[D-($\sim$-Amino-$\alpha$-phenylacetamido)]-3-(4-methyl-1,3-oxazol-2-ylthiomethyl)-3-cephem-4-carboxylic acid and its nontoxic, pharmaceutically acceptable salts are valuable as antibacterial agents, as nutritional supplements in animal and man, and are especially useful in the treatment, particularly by oral administration, of infectious diseases caused by many Gram-positive and Gram-negative bacteria.

7 Claims, No Drawings

3,687,948

7-[D-(A-AMINO-A-PHENYLACETAMIDO)]-3-(4-METHYL-1,3-OXAZOL-2-YLTHIOMETHYL-3-CEPHEM-4-CARBOXYLIC ACID AND SALTS THEREOF

BACKGROUND OF THE INVENTION

1. Field of the invention

The cephalosporins of the present invention possess the usual attributes of such compounds and are particularly useful in the treatment of bacterial infections by oral administration.

2. Description of the prior art

Cephalothin and cephaloridine are well-known antibacterial agents; see U.S. Pats. Nos. 3,218,318; 3,449,338 and 3,498,979. The literature also contains considerable data on the activity of cephaloglycin and cephalexin; see U.S. Pats. Nos. 3,303,193 and 3,507,861 and Great Britain Pat. Nos. 985,747 and 1,054,806. Newer cephalosporins include cefazolin and cephapirin; see U.S. Pat. No. 3,516,997 [and also Netherlands 68/05179 (Farmdoc 34,328) and South Africa 68/4513] and U.S. Pat. No. 3,422,100.

The literature on cephalosporins has been reviewed by E. P. Abraham Quart. Rev. (London) 21, 231 (1967), by E. Van Heyningen, Advan. Drug Res., 4, 1–70, (1967) and briefly in Annual Reports in Medicinal Chemistry, Academic Press, Inc., 111 Fifth Avenue, New York, New York, 10003, by L. C. Cheney on pages 96 and 97 (1967) and by K. Gerzon and R. B. Morin on pages 90–93 (1968). New cephalosporins are frequently reported at the annual Interscience Conference on Antimicrobial Agents and Chemotherapy as illustrated by Sassiver et al., Antimicrobial Agents and Chemotherapy–1968, American Society for Microbiology, Bethesda, Maryland; pages 101–114 (1969) and by Nishida et al., ibid, 236–243 (1970).

The preparation of various 7-[α-amino-arylacetamido]-cephalosporanic acids and the corresponding desacetoxy compounds in which aryl represents unsubstituted or substituted phenyl or 2- or 3-thienyl is described, for example, in British Pat. Nos. 985,747, 1,017,624, 1,054,806 and 1,123,333, in Belgian Pat. No. 696,026 (Farmdoc No. 29,494), in U.S. Pats. Nos. 3,311,621, 3,352,858, 3,489,750, 3,489,751, 3,489,752 and 3,518,260, in Japanese Pat. No. 16871/66 (Farmdoc 23,231), by Spencer et al., J. Med. Chem., 9 (5), 746–750 (1966) and by Kurita et al., J. Antibiotics (Tokyo) (A) 19, 243–249 (1966) and see also U.S. Pat. No. 3,485,819.

Netherlands Pats. Nos. 68/11676 (Farmdoc 36,349) and 68/12382 (Farmdoc 36,496) and U.S. Pats. Nos. 3,489,750 and 3,489,751 disclose ring-substituted cephaloglycins.

Various 7-[α-amino-arylacetamido]cephalosporins in which one hydrogen of the α-amino group is replaced by a carbonyl group which is attached in turn to another moiety have been reported. The earliest were the cephaloglycin and cephalexin precursors in which use was made of a common peptide blocking group such as carbobenzyloxy as illustrated by U.S. Pat. No. 3,364,212, Belgian Pat. No. 675,298 (Farmdoc 22,206), South African Pat. No. 67/1260 (Farmdoc 28,654) and Belgian Pat. No. 696,026 (Farmdoc 29,494). Related compounds include those of U.S. Pats. Nos. 3,303,193 and 3,311,621 and 3,518,260.

Various cephalosporins, including cephalosporin C on occasion but not cephaloglycin, have been reacted with nucleophilic, aromatic mercaptans to produce compounds having the structure

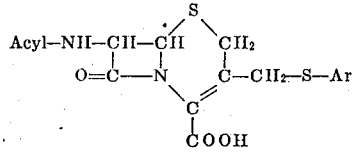

In U.S. Pat. No. 3,278,531 Ar is phenyl or certain substituted phenyls or certain aromatic heterocyclic rings named, for example, in column 5. Similar nucleophiles, e.g. 2-mercaptopyrimidines, are disclosed in U.S. Pat. No. 3,261,832 and Great Britain Pat. No. 1,101,422 and U.S. Pat. No. 3,479,350 and U.S. Pat. No. 3,502,665, all issued to Glaxo. A parallel disclosure is found in Great Britain Pat. No. 1,109,525 to Ciba, e.g. in definition h for $R_3$. Additional nucleophiles of this type were disclosed by Fujisawa in Belgium Pat. No. 714,518 (Farmdoc 35,307; Netherlands Pat. No. 68/06129 and South Africa Pat. No. 2695/68), in Canada Pat. No. 818,501 (Farmdoc 38,845), in Great Britain Pat. No. 1,187,323 (Farmdoc 31,936; Netherlands Pat. No. 67/14888), in U.S. Pat. No. 3,530,123 and in U.S. Pat. No. 3,516,997 (Farmdoc 34,328; Netherlands Pat. No. 68/05179) which includes the compound named cefazolin, which has a tetrazolylacetyl sidechain on the 7-amino group and a 5-methy-thiadiazolylthiomethyl group at the 3-position and is described at some length in the scientific literature, e.g. in Antimicrobial Agents and Chemotherapy—1969, American Society for Microbiology, Bethesda, Maryland, at pages 236–243 and in J. Antibiotics (Japan) 23(3), 131–148 (1970).

Various cephalosporins having the structure

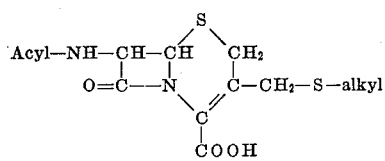

in which acyl represents various sidechains including α-aminophenylacetyl have been described in some of the above and by Glaxo in Belgium Pat. No. 734,532 (Farmdoc 41,619) and in Belgium Pat. No. 734,533 (Farmdoc 41,620)

Cephalosporins having the structure

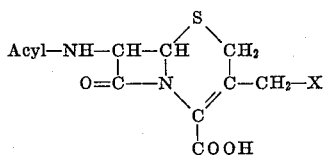

where X includes

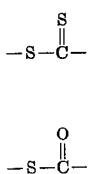

and are disclosed in some of the above and in U.S. Pats. Nos. 3,239,515, 3,239,516, 3,243,435, 3,258,561, 3,431,259 and 3,446,803.

Related publications in the scientific literature include J. Med. Chem. 8, 174–181 (1965) and J. Chem. Soc. (London) 1595–1605 (1965), 5015–5031 (1965) and 1959–1963 (1967).

SUMMARY OF THE INVENTION

This invention comprises the amphoteric compound of the formula

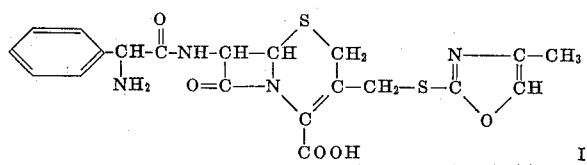

having the D configuration and existing primarily as the zwitterion, and its nontoxic pharmaceutically acceptable salts.

Such salts include the nontoxic carboxylic acid salts thereof, including nontoxic metallic salts such as sodium, potassium, calcium and aluminum, the ammonium salt and substituted ammonium salts, e.g. salts of such nontoxic amines as trialkylamines, including triethylamine, procaine, dibenzylamine, N-benzyl-betaphenethylamine, 1-ephenamine, N,N'-dibenzylethylenediamine, dehydroabietylamine, N,N'-bis-dehydroabietylethylenediamine, N-(lower)-alkyl-piperidine, e.g., N-ethylpiperidine, and other amines which have been used to form salts with benzylpenicillin; and the nontoxic acid addition salts thereof (i.e., the amines salts) including the mineral acid addition salts such as the hydrochloride, hydrobromide, hydroiodide, sulfate, sulfamate and phosphate and the organic acid addition salts such as the maleate, acetate, citrate, oxalate, succinate, benzoate, tartrate, fumarate, malate, mandelate, ascorbate and the like.

The amphoteric compound of the present invention is prepared according to the present invention by coupling with 7-amino-3-(4-methyl-1,3-oxazol-2-ylthiomethyl)-3-cephem-4-carboxylic acid (II) (or a salt or easily hydrolyzed ester thereof including those of U.S.P Pat. No. 3,284,451 and any of the silyl esters described in U.S. Pat. No. 3,249,622 for use with 7-aminopenicillanic acid and used in Great Britain Pat. No. 1,073,530) a particular acid or its functional equivalent as an acylating agent for a primary amino group. After coupling, the blocking group is removed to give the desired product. Said acid has the formula

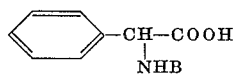

wherein B represents a blocking group of the type used either in peptide syntheses or in any of the numerous synthesis of α-aminobenzylpenicillin from 2-phenylglycine. Particularly valuable blocking groups are a proton, as in the compound of the formula

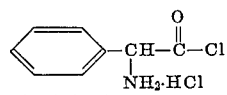

or a β-diketone as in Great Britain Pat. No. 1,123,333, e.g., methyl acetoacetate, in which case the acid containing the blocked amino group is preferably converted to a mixed anhydride, as with ethyl chloroformate, before reaction with compound II or a salt thereof to form the desired product I after acid cleavage.

Further to the discussion above of blocking groups used on the free amino group of the sidechain acid during its coupling with compound II, the blocking group is then removed to form the products of the present invention, e.g., the t-butoxy-carbonyl group is removed by treatment with formic acid, the carbobenzyloxy group is removed by catalytic hydrogenation, the 2-hydroxyl-1-naphthcarbonyl group is removed by acid hydrolysis and the trichloroethoxycarbonyl group by treatment with zinc dust in glacial acetic acid. Obviously other functionally equivalent blocking groups for an amino group can be used and such groups are considered within the scope of this invention.

Thus, with respect to said acid to be used to couple with compound II, functional equivalents include the corresponding acid anhydrides, including mixed anhydrides and particularly the mixed anhydrides prepared from stronger acids such as the lower aliphatic monoesters of carbonic acid, or alkyl and aryl sulfonic acids and of more hindered acids such as diphenylacetic acid. In addition, an acid azide or an active ester or thioester (e.g., with p-nitrophenol, 2,4-dinitrophenol, thiophenol, thioacetic acid) may be used or the free acid itself may be coupled with compound II after first reacting said free acid with N,N'-dimethylchloroformiminium chloride [cf. Great Britain Pat. No. 1,008,170 and Novak and Weichet, Experientia XXI, 6 360, (1965) ] or by the use of enzymes or of an N,N'-carbonyldiimidazole or an N,N'-carbonylditriazole [cf. South African Pat. No. 63/2684] or a carbodiimide reagent [especially N,N'-dicyclohexylcarbodiimide, N,N'-diisopropylcarbodiimide or N-cyclohexyl-N'-(2-morpholinoethyl)carbodiimide; cf. Sheehan and Hess, J. Amer. Chem. Soc., 77, 1067 (1955)], or of alkylylamine reagent [cf. R. Buijle and H. G. Viehe, Angew. Chem. International Edition 3, 582 (1964)], or of a ketenimine reagent [cf. C. L. Stevens and M. E. Mond, J. Ameri. Chem. Soc., 80, (4065)]or of an isoxazolium salt reagent [cf. R. B. Woodwar, R. A. Olofson and H. Mayer, J. Amer. Chem. Soc., 83, 1010 (1961)]. Another equivalent of the acid chloride is a corresponding azolide, i.e., an amide of the corresponding acid whose amide nitrogen is a member of an quasiaromatic fivemembered ring containing at least two nitrogen atoms, i.e., imidazole, pyrazole, the triazoles, benzimidazole, benzotriazole and their substituted derivatives. As an example of the general mehhod for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield dimidazolide. The by-product, imidazole, precipitates and may be separated and the imidazolide isolated, but this is not essential. The methods for carrying out these reactions to produce a cephalosporin and the methods used to isolate the cephalosporin so produced are well known in the art.

In the treatment of bacterial infections in man, the compounds of this invention are administered orally or parenterally, in accordance with conventional procedures for antibiotic administration, in an amount of from about 5 to 200 mg./kg./day and preferably about 5 to 20 mg./kg./day in divided dosage, e.g., three to four times a day. They are administered in dosage units containing, for example, 125 or 250 or 500 mg. of active ingredient with suitable physiologically acceptable carriers or excipients. The dosage units are in the form of liquid preparations such as solutions or suspensions or as solids in tablets or capsules.

Exactly 200 g. of 7-aminocephalosporanic acid (7–ACA) was suspended in 500 ml. of acetone and a solution of 240 g. of p-toluenesulfonic acid in 500 ml. of acetone was added in one charge. After stirring for five minutes, at room temperature, the mixture was filtered through diatomaceous earth ("Super Cel") and the bed washed with 150 ml. of acetone (the insoluble matter weighed about 30 g.). The 80 ml. of water was added to the filtrate and, while stirring, the p-toluenesulfonate salt crystallized out after scratching on the inside of the flask with a glass rod. The suspension was stirred in an ice-salt bath for thirty minutes and filtered cold. It was washed with 2 × 200 ml. of cold acetone (0° C.) and air dried; yield 250 g. of salt. This p-toluene-sulfonate salt of 7–ACA was stirred in 2 liters of methanol and the insoluble matter filtered through "Super Cel." The filtrate was placed in a 5 liter three neck flask and 2 liters of water were added. Then the pH was adjusted to 4 by the addition of concentrated ammonium hydroxide with cooling and the suspension stirred for 1 hour at 0° C. The product was collected by filtration and washed with 2 × 100 ml. $H_2O$ (0° C.) and 3 × 1 liter acetone (room temperature). After air drying, the yield of 7–ACA was 145 g.

Reference: Glaxo, British Patent 1,104,938 (1968).

The following examples are given in illustration of, but not in limitation of, the present invention. All temperatures are in degrees Centigrade. 7-Aminocephalosporanic acid is abbreviated as 7–ACA and methyl isobutyl ketone as MIBK. "Skellysolve B" is a petroleum ether fraction of B.P. 60°–68° C. consisting essentially of n-hexane.

DESCRIPTION OF THE PREFERRED EMBODIMENTS

Example 1

Sodium D-α-[1-carbomethoxypropen-2-yl)-amino]-phenylacetate

Lit. ref. F. Dane, F. Oreis, P. Konrad, T. Dockner, Angew. Chem. Intern. Ed. Engl. 1, 658 (1962); F. Dane and T. Dockner Angew. Chem. 76, 342 (1964); Spencer, Flynn, Roeske, Sin and Chauvette, J. Med. Chem., 9, 746–50 (1966); U.S. Pat. No. 3,496,171 (Lilly).

To a well stirred mixture of 40 g. (1 mole) of NaOH in 40 ml. of $H_2O$ and one liter of benzene was added 151.6 (1 mole) of D-(-)-phenylglycine. The mixture was held at about 55° C. for 30 minutes and then with vigorous stirring 116 g. (1 mole) of methyl acetoacetate was added and the mixture stirred and heated at reflux until no more water was collected in the Dean Stark trap. Next one liter of acetone was added with the heat removed and then the slurry was cooled and stirred 30 minutes in an ice-salt bath. The product was collected by filtration, washed well with copious amounts of acetone and air dried. Yield was 191 g., dec. pt. 252° C., $[\alpha]_D/22°$ C. + 207° (C = 1% $H_2O$).

4-Methyloxazole-2-thiol(2-mercapto-4-methyl-1,3-oxazole)

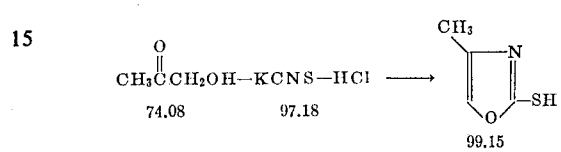

To a stirred solution of potassium thiocyanate (87.6 g., 0.9 moles) in absolute ethanol (2 l., warming was required) was added concentrated hydrochloric acid (90 ml.) at room temperature. The mixture was cooled briefly in ice and then filtered under a slight vacuum. Acetol (44.4 g., 0.6 moles) was added to the filtrate and the solution was heated at reflux temperature for 24 hours. The solvent was removed in vacuo and the solid residue was taken up in hot water (500 ml.). The product (33.3 g.) m.p. 148°–150° crystallized on cooling. A second crop (6.9 g.) m.p. 147°–149° was obtained on cooling the mother liquor to 0°. Evaporation of the filtrate to dryness in vacuo and crystallization of the residue from water-ethanol (3:1, charcoal) gave a third crop (7.9 g.) of the product m.p. 146°–149°. In general, further purification of the thiol was not necessary. It could, however, be recrystallized from aqueous: ethanol (3:1) to give material with m.p. 150°–152° [lit m.p. 150°–152°; the method used for the preparation of this thiol was identical to that described by C. K. Bradsher and W. J. Jones Jr., J. Org. Chem. 32, 2079 (1967)].

7-Amino-3-(4-methyl-1,3-oxazol-2-ylthiomethyl)-3-cephem-4-carboxylic acid. (II)

Thirteen and six-tenths grams (0.05 mole) of 7–ACA was added to 250 ml. of 0.1 M phosphate buffer pH 6.4, followed, with stirring, by 8.4 g. (0.10 mole) of $NaHCO_3$. Then 5 g. (0.055 mole) of 2-mercapto-4-methyl-1,3-oxazole was added and the mixture stirred for 6 hours at 55° C. under a nitrogen atmosphere. During the reaction the product crystallized out and after the 6 hour heating period the slurry was cooled to 22° C. and the product, 7-amino-3-(4-methyl-1,3-oxazol-2-ylthiomethyl)-3-cephem-4-carboxylic acid, collected by filtration and washed with cold water then acetone and air dried. Yield 4.8 g. dec. at 210° C. The IR and NMR spectra were entirely consistent with the desired structure.

Anal. Calc. for $C_{12}H_{13}N_3O_4S_2$: C, 44.06; H, 4.05; N, 12.84.

Found: C, 43.71; H, 4.22; N, 12.98. (corrected for 1.6% $H_2O$ found by K. F. method).

7-(D-α-Amino-α-phenylacetamido)-3-(4-methyl-1,3-oxazol-2-yl-thiomethyl)-3-cephem-4-carboxylic acid (I)

To a stirred suspension of 4.06 g. (0.015 mole) of sodium D-α-[1-carbomethoxypropen-2-yl)- amino]-phenylacetate, finely ground in 40 ml. of acetonitrile was added 2 drops of N,N-dimethylbenzyl-amine and the slurry cooled to −10° C. and then 1.6 g. (0.015 mole) of ethyl chloroformate was added, and after 15 min. an ice cold solution of 4.8 g. (0.015 mole) of 7-amino-3-(4-methyl-1,3-oxazol-2-ylthiomethyl)-3-cephem-4-carboxylic acid in 2.1 ml. (0.015 mole) of triethylamine, 20 ml. H$_2$0 and 20 ml. of acetronitrile was added, all at once with vigorous stirring. The temperature was maintained at 0° C. to 30 minutes and then salt (NaCl) was added to saturate the solution. The organic layer was separated and to it added 20 ml. of water and the bulk of the acetonitrile removed in vacuo at 20° C. Next, a solution of 6 ml. of 90% formic acid in 50 ml. of methyl isobutyl ketone was added and the mixture shaken for several minutes and then cooled at 0° C. for 2 hours with stirring. The resulting ppt. was collected by filtration and crystallized by suspending in 50 ml. of 10% H$_3$PO$_4$, filtering off the insolubles and stirring the filtrate with 1 g. of activated charcoal ("-Darko KB") for 10 minutes, filtering again and adjusting the pH to 3.5 by the addition of solid NaHCO$_3$. Yield 540 mg. of 7-(D-α-amino-α-phenyl-acetamido)-3-(4-methyl-1,3-oxazol-2-ylthiomethyl)-3-cephem-4-carboxylic acid dec. pt. ≈ 150° C. the IR was consistent with the desired structure.

Anal. Calcd. for C$_{20}$H$_{20}$N$_4$O$_{52}$·H$_2$O; C, 50.10; H, 4.45; N, 11.69; H$_2$0, 3.9.

Found: C 50.77; H, 5.12; N, 11.41; H$_2$0, 4.5.

7-[D-(α-Amino-α-phenylacetamido)]-3-(4-methyl-1,3-oxazol-2-ylthiomethyl)-3-cephem-4-carbolic acid (called New Compound) after solution in aqueous NaHCO$_3$ followed by dilution with Nutrient Broth was found to exhibit the following Minimum Inhibitory Concentrations (M.I.C.) in mcg./ml. versus the indicated microorganisms as determined by overnight incubation at 37° C. by Tube Dilution. Results with three old compounds are also given.

TABLE 1

| Organism | | M.I.C. in mcg./ml. | | |
|---|---|---|---|---|
| | | new cepha-cpd. | cepha-lexin | cepha-lothin | cepha-loridine |
| D. pneumoniae + 5% serum* | A9585 | 0.08 | 0.16 | 0.04 | 0.004 |
| Str. pyogenes + 5% serum* | A9604 | 0.08 | 0.16 | 0.04 | 0.004 |
| S. aureus Smith | A9537 | 1.3 | 1.3 | 0.08 | 0.016 |
| S.aureus Smith + 50% serum | A9537 | 2.5 | 1.3 | 0.16 | 0.016 |
| S. aureus BX1633-2 at 10$^{-3}$ dil'n | A9606 | 1.3 | 2.5 | 0.16 | 0.6 |
| S. aureus BX1633-2 at 10$^{-1}$ dil'n | A9606 | 8 | 8 | 0.3 | 16 |
| S. aureus meth.- resistant | A15097 | 4 | 16 | 0.6 | 0.6 |
| Sal. enteritidis | A9531 | 0.5 | 4 | 0.3 | 0.6 |
| E. coli Juhl | A15119 | 8 | 8 | 16 | 2 |
| E. coli | A9675 | 16 | 16 | 63 | 4 |
| K. pneumoniae | A9977 | 4 | 8 | 1 | 1 |
| K. pneumoniae | A15130 | 16 | 16 | 32 | 2 |
| Pr. mirabilis | A9900 | 4 | 8 | 1 | 1 |
| Pr. morganii | A15153 | 63 | >125 | >125 | >125 |
| P. aeruginosa | A9843A | >125 | >125 | >125 | >125 |
| Ser. marcescens | A20019 | >125 | >125 | >125 | >125 |

*50% Nutrient Broth + 45% Antibiotic Assay Broth

Blood levels in the mouse after oral administration were determined with the following results:

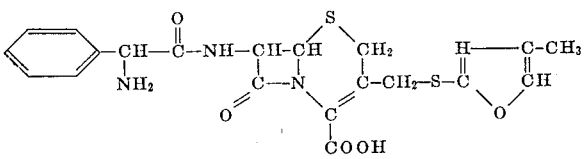

| | | Blood level in mcg./ml. | | | |
|---|---|---|---|---|---|
| | | | Hours after administration | | |
| | Dose, mgm./kg. | 0.5 | 1 | 2 | 3.5 |
| —S—C(=N)—CH (4-methyl-oxazolyl) | 100 | 12.3 | | | |
| H (cephalexin) | 100 | 44.5 | 13.5 | 3.4 | 0.79 |
| | 50 | 21.5 | | | |
| | 20 | 8.79 | 3.51 | 0.58 | <0.16 |
| —O—C(=O)—CH$_3$ (cephaloglycin) | 20 | 1.1 | 1.0 | 0.42 | 0.19 |

Example 2

Sodium 7-[D-(α-amino-α-phenylacetamido)]-3-(4-methyl-1,3-oxazol-2-ylthiomethyl)-3-cephem-4-carboxylate To a stirred aqueous suspension of the zwitterionic form of 7-[D-(α-amino-α-phenylacetamido)]-3-(4-methyl-1,3-oxazol-2ylthio-methyl)-3-cephem-4-carboxylic acid (0.8 mole) is added 1 N aqueous sodium hydroxide at room temperature until a clear solution (pH 10.8) is obtained. This solution is immediately freeze-dried to give impure, solid sodium 7-[D-(α-amino-α-phenylacetamido)]-3-(4-methyl-1,3-oxazol-2-ylthiomethyl)-3-cephem-4-carboxylate.

I claim:

1. The compound having the D configuration in the sidechain of the formula or a nontoxic, pharmaceutically acceptable salt thereof.

2. The compound having the D configuration in the sidechain of the formula

3. The sodium salt of the compound of claim 2.

4. The potassium salt of the compound of claim 2.

5. The hydrochloride of the compound of claim 2.
6. The zwitterion form of the compound of claim 2.

7. A nontoxic, pharmaceutically acceptable acid addition salt of the compound of claim 2.

* * * * *